UNITED STATES PATENT OFFICE.

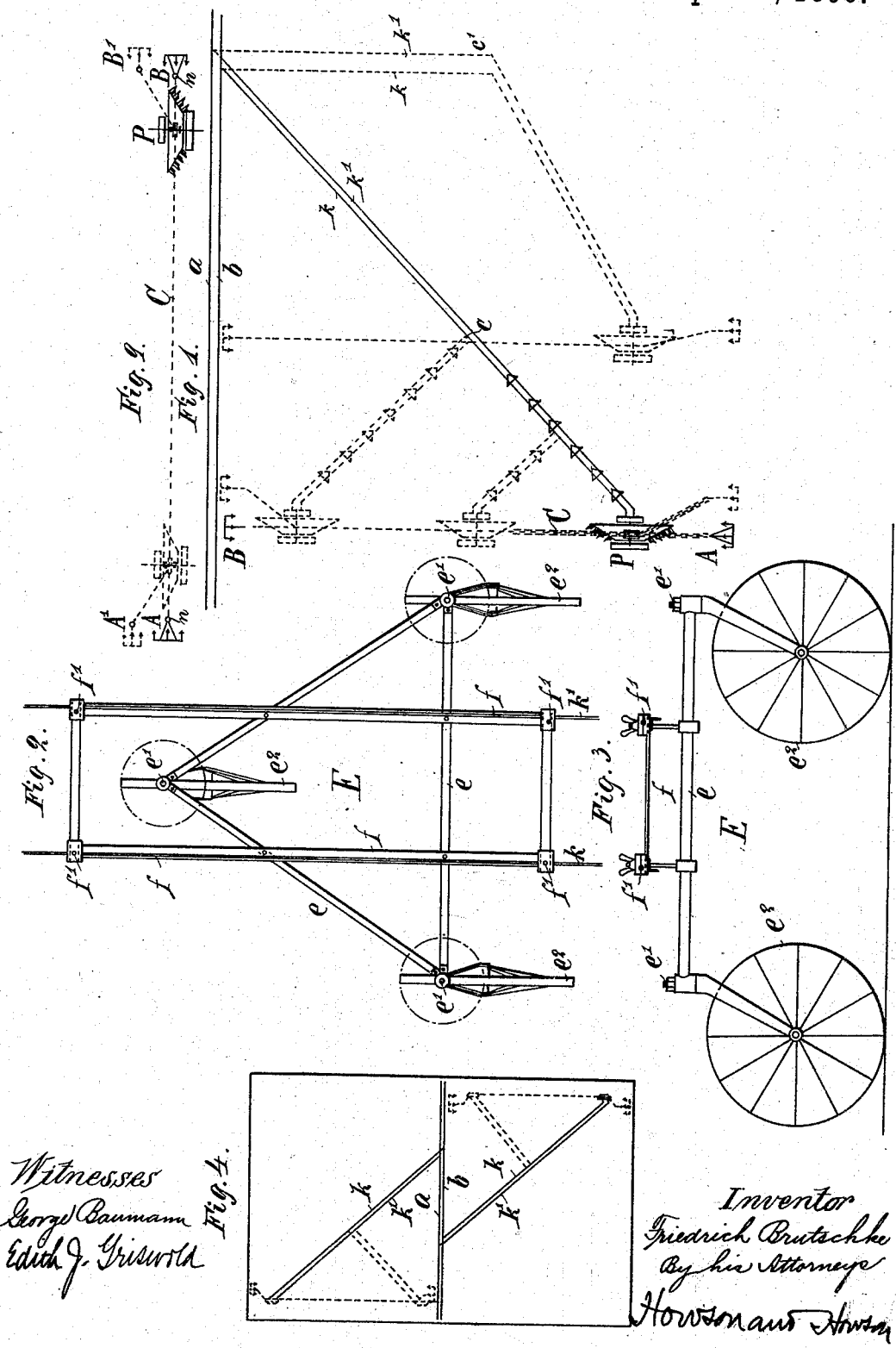

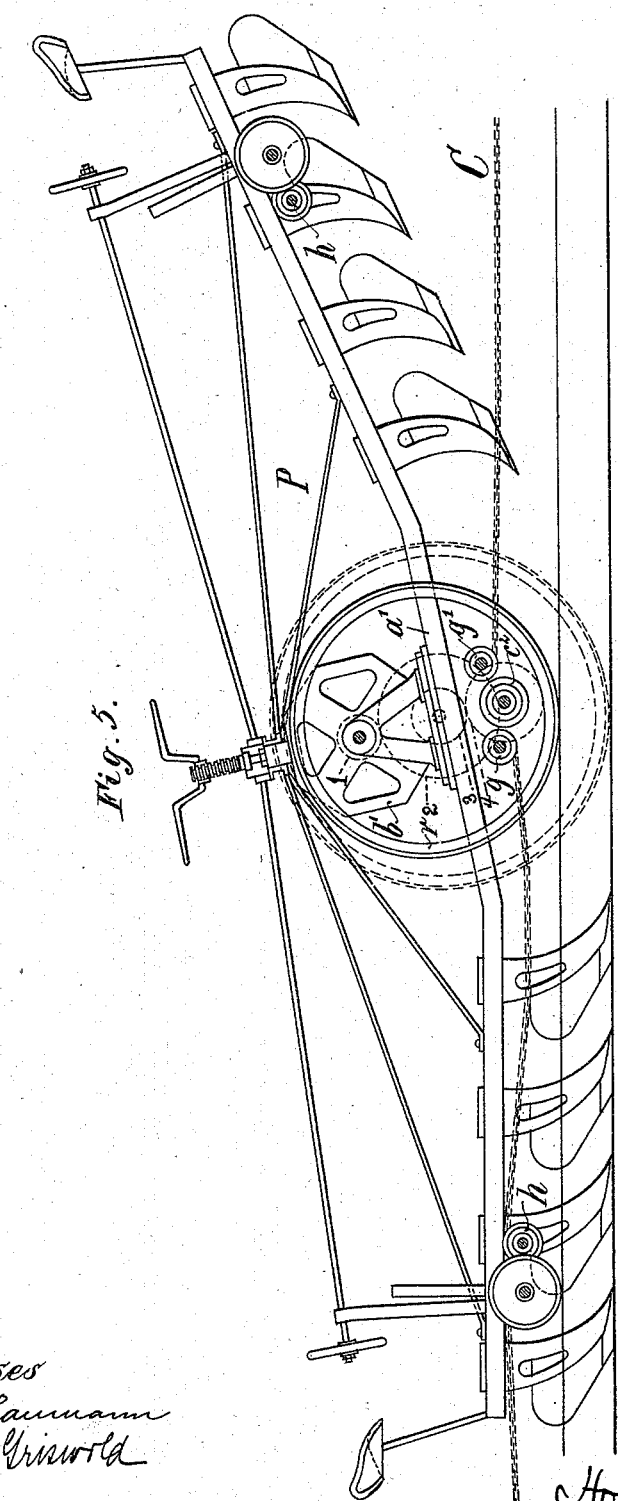

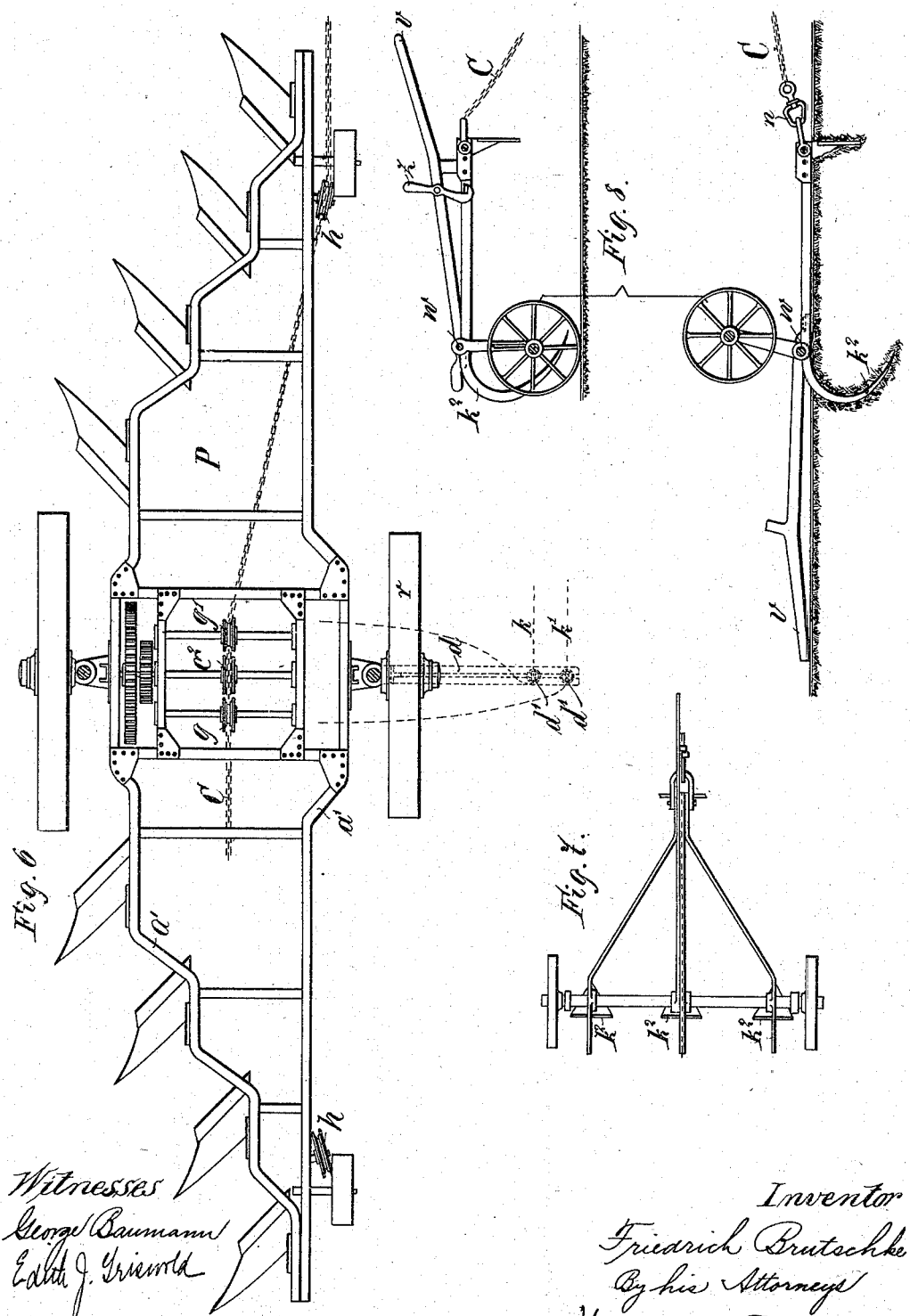

FRIEDRICH BRUTSCHKE, OF CHARLOTTENBURG, GERMANY, ASSIGNOR TO FABRIK LANDWIRTH SCHAFTLICHER MASCHINEN F. ZIMMERMANN & CO., ACTIEN-GESELLSCHAFT, OF HALLE-ON-THE-SAALE, GERMANY.

PLOWING BY ELECTRICITY.

SPECIFICATION forming part of Letters Patent No. 559,256, dated April 28, 1896.

Application filed January 2, 1895. Serial No. 533,565. (No model.) Patented in Germany February 10, 1894, No. 79,281, and in Austria October 5, 1894, No. 44/5,321.

*To all whom it may concern:*

Be it known that I, FRIEDRICH BRUTSCHKE, a subject of the German Emperor, and a resident of Charlottenburg, Germany, have invented Improvements in or Connected with Ploying by Electricity, (for which Letters Patent have been obtained in Germany, No. 79,281, dated February 10, 1894, and in Austria, No. 44/5,321, dated October 5, 1894,) of which the following is a specification.

The present invention relates to improvements in the application of electricity for driving plows.

The first idea which suggested itself for working plows by electricity was the utilization of electrically-propelled carriages which take the place of traction-engines, plows attached to the electric carriage in front and behind being alternately raised and lowered. This plan dispensed with the necessity of turning the carriage, but involved the shifting of the conductors every time the carriage had completed a double journey to the extent of the width of the furrows and occasioned a waste of time and was costly, inasmuch as it required a double conductor along three sides of the field to be plowed. Moreover, for plowing a special kind of conductor was required to convey the current to the electromotor, since, as the cables could not be allowed to slide along the ground, which is loose and often hilly and stony, the ordinary contact-carriage is not available, less in consequence of an obstacle than that the tackle or the contact-rollers should spring out or the cable be injured.

The present invention obviates these disadvantages by the combination, with a tipping or balance plow, of an electromotor with special arrangements for conveying the current.

In the accompanying drawings, Figures 1 and 4 are diagrammatical plan views illustrating the method of working with the plow and the position of the cables for conveying the current. Figs. 2 and 3 are respectively a ground plan and side elevation of the carriage which supports the cable and which can adapt itself to every movement of the plow. Fig. 5 is a front elevation of a plow provided with an electromotor; and Fig. 6 is a plan of the plow, the electromotor being omitted for the sake of clearness. Figs. 7 and 8 are side views and a plan showing the ground-anchor in and out of the ground. Fig. 9 is a diagram illustrating the method employing the ground-anchor.

The power is supplied from a generating-station to the reversible electromotor $b'$ of the plow P either along conductors at one side of the field to be plowed at right angles to the direction of travel of the plow, as shown in Fig. 1, or in the case of very long fields on a line bisecting the field to be plowed, as shown in Fig. 4, the conductors $a$ and $b$ being carried by insulators on poles. If it be desired to use a compound-wound dynamo for supplying the power, the number of the conductors used must correspond with the dynamo. From these two conductors $a$ and $b$ two cables $k$ $k'$ extend to the two terminals of the electromotor $b'$ of any suitable construction, the said cables being attached to the conducting-wires $a$ $b$ by clamps and led over the field to be plowed in a diagonal direction to the electromotor $b'$ of the plow P, which is standing ready for work by the side of the anchor A, Fig. 1. Upon the frame of the plow is a projecting arm $d$, with insulators $d'$ for the attachment of these two cables $k$ $k'$ (see dotted lines, Fig. 6) projecting over the land-wheel $r$. A suitable switch serves for reversing the direction of rotation of the motor $b'$.

Half the length of the two insulated cables $k$ $k'$, measured from the conductors $a$ $b$, lies free upon the ground, while the other half, fastened to the plow P, is carried by a number of light three-wheeled carriages or porters E with high wheels, as shown in Figs. 2 and 3. These cable-carrying carriages or porters consist each of a triangular frame $e$, supported at the angles by wheels $e^2$, the standards of which work in vertical bearings $e'$, so that the wheels will adjust themselves automatically to the direction of traction and adapt themselves to every inequality of the surface of the ground. A frame $f$, secured to the triangular carriage E, is provided with four wooden or other insulated clamps $f'$, in which the cables $k\ k'$ can be properly clamped side by side. If now the plow P moves from the anchor A, Fig. 1, toward the anchor B, the cables $k\ k'$ are carried in the same direction by the cable-porters E and take up the positions shown in dotted outline until the plow reaches the anchor B, so that the cables and their porters execute a to-and-fro movement, the center of rotation of which lies at $c$ in the center of the field to be plowed. As the plow P returns from B to A the cables $k\ k'$ gradually return to the position shown in full lines. When the plow, as the process of plowing is continued, reaches the vicinity of the center of rotation $c$, the cable-porters are shifted from the point $c$ to $c'$, so that now the cables move to and fro around the point $c'$.

The electromotor $b'$ on the plow-frame $a'$, Figs. 5 and 6, moves the plows by means of a chain C, which lies upon the ground between the two anchors A B, while in mechanically-driven plows hitherto in use this has been effected by traction by means of ropes from a definite source of power and moving over the field. The essential novelty thus consists in the case of the plow referred to herein in the direct combination of the plow with a motor, all intermediate mechanism—such as cables, windlasses, &c.—being dispensed with.

The electromotor $b'$ is so arranged upon the framing $a'$ of the balanced four-furrow tipping plow P that the mid-plane of the plow corresponds with that of the motor. From the axle of the motor, by means of a double wheel-gearing 1 2 3 4, a chain-wheel $c^2$, which also lies in the mid-plane, is driven, and the speed of the latter is adapted to the rate of rotation of the motor $b'$ by means of the aforesaid gearing.

The chain C, which is stretched over the field, is led over this chain-wheel $c^2$ and is kept in the proper direction by guide-rollers $g\ g'$ in front and behind. The end of the chain C which passes from the end of the plow P which is at the moment in the rear is led to a suitably-arranged roller $h$ and passes off on the unplowed side, so that the loose end of the chain may not be plowed in.

The chain C is secured at the ends of the field by means of the ground-anchors $k^2$. (Shown in Figs. 7 and 8.) These consist of three or four (according to the size of the plow) leaf-shaped anchors $k^2$, connected with a cranked axle $w$, furnished with two wheels. These anchors, when the axle is pulled upon by the chain C and rotates in consequence, enter the ground, and after the chain has moved from five to eight inches anchor it fast. On the other hand, the anchor can be easily raised out of the ground by rotating a hand-lever $v$, and after the pawl $z$ has been placed under a projection on the frame of the ground-anchor the latter may easily be removed by means of this hand-lever to another point, only one laborer being required for the purpose.

The method of working with the mechanical plow is as follows: One ground-anchor, A, Fig. 9, having been secured in the ground, the chain C is attached to it by means of a rotating swivel $n$ on the latter and is passed over the chain-wheel $c^2$ through the plow and across the field. The second ground-anchor, B, is then secured in the ground at the opposite end of the field. The motor $b'$ being then switched into the corresponding direction of rotation, the plow P is caused to travel upon the chain across the field, being steered from the driver's seat in the usual way and the depth of the furrow regulated at the same time. When the plow has reached the anchor B and has been stopped, the plow is tipped, the chain loosened at the end which has been the traction end by a few turns of the motor in the reverse direction, so that the anchor B can be raised, shifted through a distance corresponding to twice the breadth of the furrows to B', Figs. 1 and 9, and again secured in the soil. The plow is now guided into the new furrow, and the return movement carried out by the rotation of the motor as far as the anchor A, which is then shifted in the way just described.

The following important advantages are gained by the use of this invention: First, the only motor required in the field is the one which is mounted on the plow; second, the very considerable wear and tear of rope which has hitherto been experienced in mechanical plowing, as well as the loss of power caused by the friction of the rope and by braking the drum of the windlass, are entirely got rid of, a considerable economy in power being the result; third, the present mechanical plow can, in consequence of its construction, be used even on hilly ground; fourth, since the driver of the plow has the motor entirely under his control, there is no necessity for any signaling, and, further, since the employment of the electromotor renders it possible to use an arc or incandescent lamp the plowing can be carried on even during thick fog or in the night-time; fifth, the price of the complete outfit with a generating-station is considerably less than the cost of a complete steam-plowing tackle, and, moreover, in addition to the saving in interest, &c., there is considerable economy in labor. In like manner driving power can be supplied to other agricultural machinery.

I claim as my invention—

1. A balanced tipping plow having an electric motor mounted thereon and a chain-wheel actuated by the motor, in combination with a chain to be stretched across a field and anchored, and movable cables to convey a current of electricity to the motor, the portion of the cables nearest the plow being adapted to swing in a horizontal plane around a variable fixed point in the field as the plow moves back and forth, substantially as described.

2. A plow having an electric motor mounted thereon, in combination with a chain stretched across a field, movable cables to convey the current to the electric motor, and one or more free cable-carrying carriages to support the cable as it moves, substantially as described.

In testimony whereof I have affixed my signature in presence of two subscribing witnesses.

FRIEDRICH BRUTSCHKE.

Witnesses:
RICHARD SCHMIDT,
CHRIS. KRÜGER.